US006899299B2

(12) United States Patent
Ritts

(10) Patent No.: US 6,899,299 B2
(45) Date of Patent: May 31, 2005

(54) LUGGAGE BINS AND AIRCRAFT PASSENGER CABIN CEILINGS

(75) Inventor: Michael A. Ritts, Seattle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/206,777

(22) Filed: Jul. 26, 2002

(65) Prior Publication Data

US 2004/0016847 A1 Jan. 29, 2004

(51) Int. Cl.[7] .............................................. B64D 11/00
(52) U.S. Cl. .................................................. 244/118.5
(58) Field of Search .......................... 244/118.5, 118.1; 312/269, 246, 247, 272, 319.5

(56) References Cited

U.S. PATENT DOCUMENTS

| 3,102,607 A | * | 9/1963 | Roberts |
| 4,275,942 A | * | 6/1981 | Steidl |
| 4,368,937 A | * | 1/1983 | Palombo et al. |
| 5,129,597 A | * | 7/1992 | Manthey et al. ......... 244/118.5 |
| 5,203,619 A | * | 4/1993 | Welsch et al. .............. 312/247 |
| 5,244,269 A | * | 9/1993 | Harriehausen et al. |
| 5,441,218 A | * | 8/1995 | Mueller et al. |
| 5,535,852 A | * | 7/1996 | Bishop et al. ............... 187/336 |
| 5,934,615 A | * | 8/1999 | Treichler et al. |
| 6,045,204 A | * | 4/2000 | Frazier et al. |
| 6,073,624 A | * | 6/2000 | Laurent |
| 6,484,969 B2 | * | 11/2002 | Sprenger et al. ......... 244/118.5 |
| 6,598,829 B2 | * | 7/2003 | Kamstra ................... 244/118.1 |

FOREIGN PATENT DOCUMENTS

| DE | 4029628 | * 10/1991 | .............. 244/118.5 |

* cited by examiner

Primary Examiner—Tien Dinh
(74) Attorney, Agent, or Firm—Perkins Coie LLP

(57) ABSTRACT

Luggage bins for use with aircraft passenger cabins, and aircraft passenger cabin ceilings, such as asymmetrical ceilings. In one embodiment, a luggage bin includes a first portion configured to support luggage and a second portion having an opening configured to receive the first portion when the luggage bin is in a closed configuration. In one aspect of this embodiment, the second portion is positioned proximate to a ceiling portion of an aircraft passenger cabin. A support member extends upwardly from the first portion and includes an upper region fixedly attached proximate to the second portion. In a further aspect of this embodiment, the support member is extendable and retractable along an operating axis to move the first portion up and down relative to the second portion to open and close the luggage bin.

62 Claims, 7 Drawing Sheets

LUGGAGE BINS AND AIRCRAFT PASSENGER CABIN CEILINGS

TECHNICAL FIELD

The following disclosure relates generally to luggage bins and aircraft passenger cabin ceilings and, more particularly, to aircraft passenger cabin luggage bins and aircraft passenger cabin ceiling configurations.

BACKGROUND

Aircraft passenger cabins generally include some form of luggage bin so that passengers can stow their carryon luggage during a flight. Typically, these luggage bins are positioned on the left and right sides of passenger cabins, directly above the outboard seat sections and, in multi-aisle aircraft, above the center seat section. These luggage bins often include doors that open by rotating upwardly, enabling the passengers to stow or remove their luggage while standing in the aisles adjacent to their seats.

There are a number of shortcomings associated with conventional luggage bins used in aircraft passenger cabins. One shortcoming is that passengers stowing their luggage in the bins impede the progress of other passengers to their seats. For example, as passengers file into a passenger cabin for a flight, they typically pause momentarily adjacent to their seats to stow their luggage. When a passenger does this, the flow of passengers into the passenger cabin is momentarily stalled until the passenger has hoisted his or her luggage into the bin and taken a seat.

Another shortcoming often associated with conventional aircraft luggage bins is that they reduce headroom. Typically, the bottom of aircraft luggage bins is placed so low over the outboard seat sections that passengers in these seats are unable to stand unless they first move out into the aisle. Accordingly, these passengers are generally unable to stand up and stretch during flight, resulting in increased body fatigue. Further, the low placement of the luggage bins may cause some passengers seated in the outboard seat sections to feel somewhat claustrophobic, thereby detracting from their overall flying experience.

SUMMARY

The following disclosure is directed to luggage bins and associated aircraft passenger cabin configurations. In one embodiment, a luggage bin configured for use with an aircraft passenger cabin can include a first portion configured to support luggage and a support member extending upward from the first portion. In one aspect of this embodiment, the support member can have a lower region, an upper region, and an operating axis. The lower region of the support member can be fixedly attached to the first portion of the luggage bin, and the upper region can be configured to be fixedly attached at least proximate to a ceiling portion of the passenger cabin. The support member can be extendable and retractable along the operating axis to move the first portion relative to the ceiling portion when the upper region of the support member is fixedly attached at least proximate to the ceiling portion.

In another embodiment, the luggage bin can further include a second portion having an opening configured to at least partially receive the first portion. In one aspect of this embodiment, the second portion can be configured to be positioned proximate to the ceiling portion of the passenger cabin. In a further aspect of this embodiment, the support member can be extendable and retractable along the operating axis to move the first portion between a first position at least approximately adjacent to the opening in the second portion and a second position offset from the opening.

In another embodiment, a ceiling for a passenger cabin of an aircraft can include a central portion at least generally alignable with a longitudinal axis of the aircraft, a first side portion positioned on a first side of the central portion, and a second side portion positioned on a second side of the central portion. In one aspect of this embodiment, the first side portion can have a first cross-sectional shape, and the second side portion can have a second cross-sectional shape different than the first cross-sectional shape. For example, the first side portion, the central portion, and the second side portion together can define a wave-like cross-sectional shape. In another aspect of this embodiment, the first side portion, the central portion, and the second side portion together can define a wave-like cross-sectional shape wherein the central portion includes an inflection point of the wave-like cross-sectional shape.

In yet another embodiment, a method for manufacturing an aircraft passenger cabin having a luggage bin can include installing a ceiling portion in a portion of the aircraft, the ceiling portion having a left-side portion, a right-side portion, and a center portion. In one aspect of this embodiment, the method can further include positioning a luggage bin second portion at least proximate to the center portion of the ceiling portion, the luggage bin second portion having an opening configured to receive a luggage bin first portion. In a further aspect of this embodiment, the method can further include extending a support member through the opening in the luggage bin second portion, attaching an upper region of the support member at least proximate to the second portion, and attaching a lower region of the support member to the luggage bin first portion. In yet another aspect of this embodiment, the luggage bin first portion can be configured to support luggage, and the support member can be extendable and retractable along the operating axis to move the first portion between a first position at least partially adjacent to the opening in the luggage bin second portion and a second position offset from the opening.

DETAILED DESCRIPTION

Figure 1A:
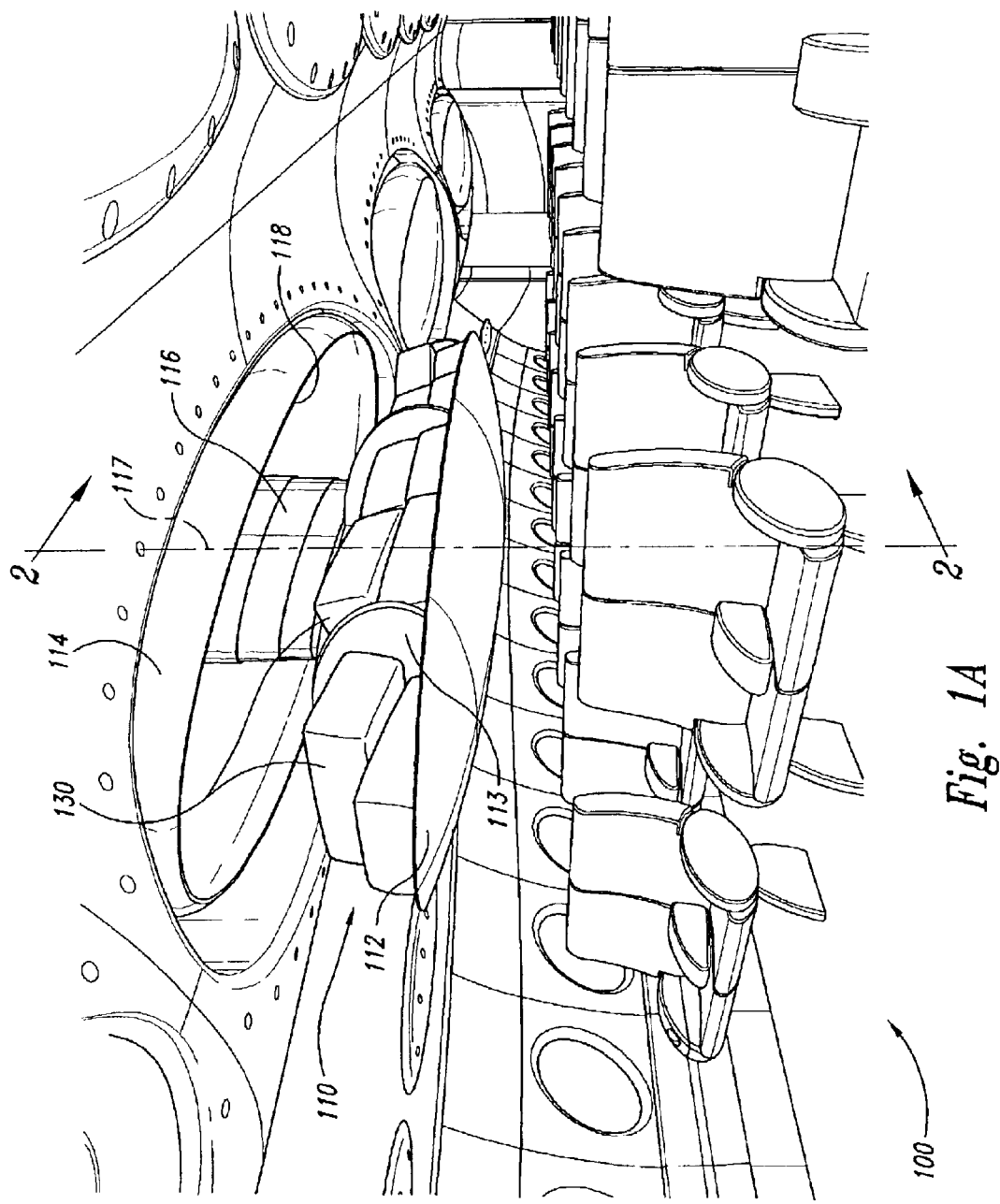
FIGS. 1A and 1B are partially cutaway front isometric views of an aircraft passenger cabin having a luggage bin in opened and closed configurations, respectively, in accordance with an embodiment of the invention.

The following disclosure describes luggage bins usable with aircraft passenger cabins. Certain specific details are set forth in the following description and in FIGS. 1A–7B to provide a thorough understanding of various embodiments of the invention. Those of ordinary skill in the relevant art will understand, however, that the present invention may have additional embodiments and may be practiced without several of the details described below. In other instances, well-known structures and systems often associated with aircraft and aircraft passenger cabins have not been shown or described in detail here to avoid unnecessarily obscuring the description of the various embodiments of the invention.

In the drawings, identical reference numbers identify identical or substantially similar elements. To facilitate the discussion of any particular element, the most significant digit or digits in a reference number refers to the figure number in which that element is first introduced. For example, element 202 is first introduced and discussed in reference to FIG. 2. Further, the dimensions, angles, and other specifications shown in the figures are representative of particular embodiments of the invention. Accordingly, other embodiments of the invention can have other dimensions, angles, and specifications without departing from the spirit or scope of the present invention.

Figure 1B:
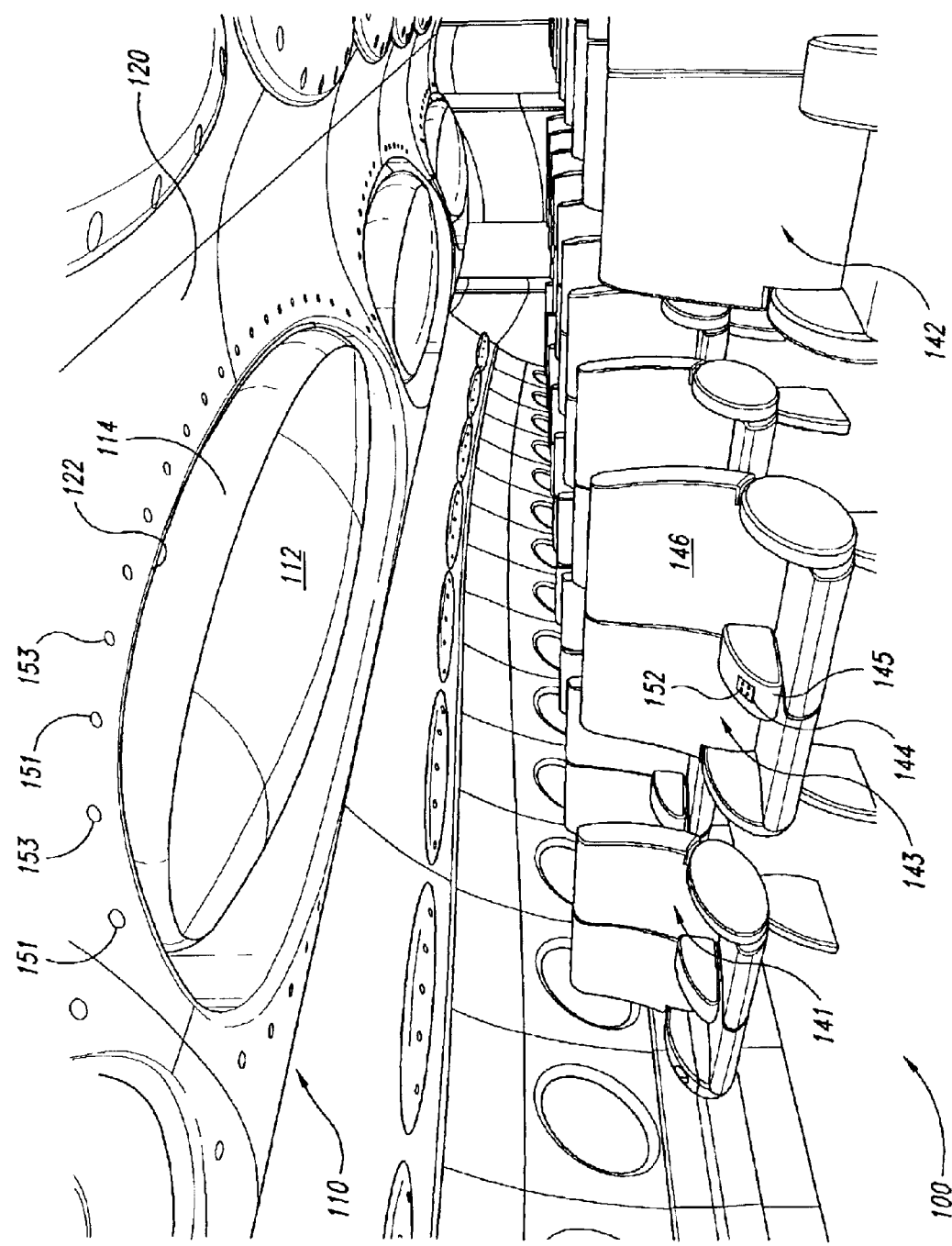

FIGS. 1A and 1B are partially cutaway front isometric views of an aircraft passenger cabin 100 having a luggage bin 110 in opened and closed configurations, respectively, in accordance with an embodiment of the invention. In one aspect of this embodiment shown in FIG. 1A, the luggage bin 110 includes a carrying or first portion 112 having a tray-like configuration, and a second portion 114 having an opening 118 shaped and sized to receive the first portion 112. The first portion 112 is shown in FIG. 1A in a first or lowermost position offset from the second portion 114. In a further aspect of this embodiment, the first portion 112 can include one or more stiffeners 113 to enhance the structural rigidity of the first portion 112. In other embodiments, the stiffeners 113 can be omitted, or other forms of structural enhancement can be used. In yet another aspect of this embodiment, a support member 116 extends upwardly from the first portion 112 through the opening 118 and is fixedly attached proximate to the second portion 114. As will be explained in greater detail below, the support member 116 is extendable and retractable along an operating axis 117 to move the first portion 112 between the first position shown in FIG. 1A and a second or uppermost position (shown in FIG. 1B) in which the first portion 112 is positioned adjacent to the second portion 114 to at least partially cover the opening 118.

When the first portion 112 is in the first position as shown in FIG. 1A, passengers (not shown) can place luggage 130 on the first portion 112 as they enter the passenger cabin 100. In one aspect of this embodiment, the first portion 112 can be configured to support between about two pieces and about 30 pieces of carryon-size luggage 130. For example, in one embodiment, the first portion 112 can be configured to support between about two pieces and about 10 pieces of carryon-size luggage 130. In another embodiment, the first portion 112 can be configured to support between about 10 pieces and about 20 pieces of carryon-size luggage 130. In yet another embodiment, the first portion 112 can be configured to support between about 20 pieces and about 30 pieces of carryon-size luggage 130. In other embodiments, the first portion 112 can be configured to support more or less luggage.

In one aspect of this embodiment, the first portion 112 has an elliptical planform that allows passengers to access the entire perimeter of the first portion 112 for depositing or retrieving the luggage 130. In a further aspect of this embodiment, the opening 118 in the second portion 114 has approximately the same elliptical shape as the first portion 112. Accordingly, when the first portion 112 is retracted into the opening 118, the first portion 112 fits at least approximately flush with the second portion 114. In other embodiments, the first portion 112 can have other shapes, such as a round, oval, or rectangular shape. In yet other embodiments, the first portion 112 can be offset from the second portion 114 when the luggage bin 110 is in a closed configuration.

Referring now to FIG. 1B, an embodiment of the passenger cabin 100 includes a left-side seat section 141, a right-side seat section 142, a center seat section 143, and a ceiling portion 120 over the seat sections 141–143. In one aspect of this embodiment, the ceiling portion 120 has an asymmetrical cross-section, providing an architecturally pleasing shape that efficiently utilizes space within the passenger cabin 100. For example, in one embodiment, the ceiling portion 120 includes a recess 122 configured to receive the second portion 114 of the luggage bin 110. When the first portion 112 of the luggage bin 110 is in the second or stowed position shown in FIG. 1B, the luggage bin 110 integrates with the ceiling portion 120 to give the upper portion of the passenger cabin 100 a generally smooth appearance, increasing space above the left- and right-side seat sections 141 and 142. In other embodiments, the ceiling portion 120 can have other cross-sections. For example, in other embodiments, the ceiling portion 120 can have other asymmetrical cross-sections. In yet other embodiments, the ceiling portion 120 can have symmetrical cross-sections.

A number of passenger convenience features can be incorporated into the ceiling portion 120 in accordance with an embodiment of the invention. For example, in one embodiment, a plurality of lights 151 and air outlets 153 are integrated with the ceiling portion 120 around the recess 122 for the luggage bin 110. In other embodiments, the lights 151 and the air outlets 153 can be positioned at other locations in the passenger cabin 100. The lights 151 and the air outlets 153 can be directed toward one or more of the passenger seats 146 in the seat sections 141–143 to provide one or more passengers with light and/or air. Controls 152 for operating the lights 151 and the air outlets 153 can be installed on a control panel 144, which is ergonomically incorporated into an armrest 145 of a seat 146 in a central seat section 143. Accordingly, a passenger (not shown) seated in the passenger seat 146 can adjust the ambient light and/or air flow by manipulating the controls 152. In yet other embodiments, the lights 151 and the air outlets 153 can be adjusted by other controls having other positions.

Figure 2:
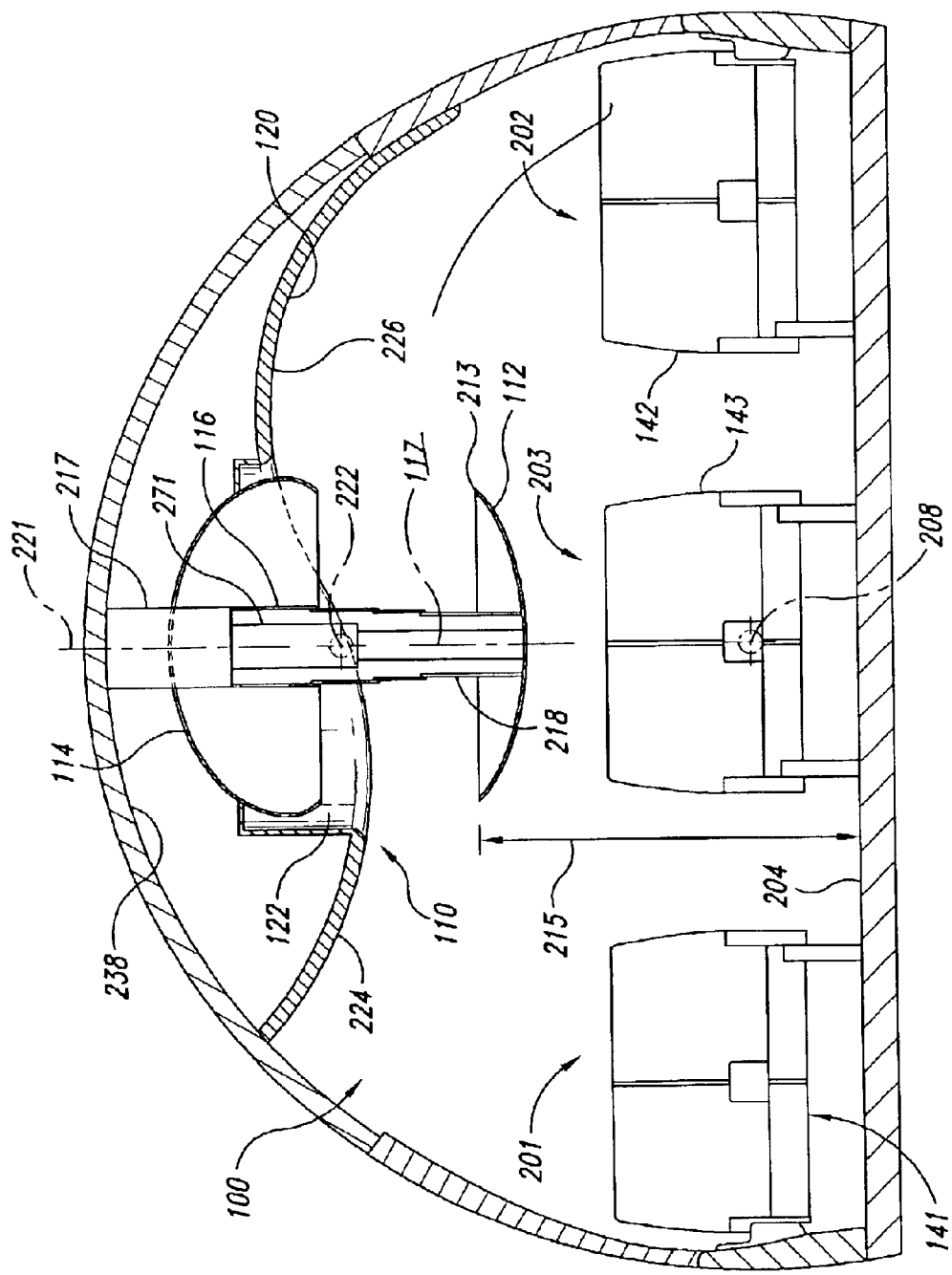
FIG. 2 is a partially hidden forward cross-sectional elevation view of the passenger cabin shown in FIG. 1A in accordance with an embodiment of the invention taken substantially along line 2—2 in FIG. 1A.

FIG. 2 is a partially hidden forward cross-sectional elevation view of the passenger cabin 100 in accordance with an embodiment of the invention taken substantially along line 2—2 in FIG. 1A. The luggage 130 and the stiffeners 113 shown in FIG. 1A have been omitted from FIG. 2 for purposes of clarity. In one aspect of this embodiment, the passenger cabin 100 includes a left-side portion 201, a right-side portion 202, and a central portion 203. The ceiling portion 120 can include a centerline 221 at least generally aligned with a longitudinal axis 208 of the aircraft cabin 100.

In one aspect of this embodiment, the ceiling portion 120 further includes a first cross-sectional shape 224 on a first side of the centerline 221 and a second cross-sectional shape 226 on a second side of the centerline 221. In a further aspect of this embodiment, the first cross-sectional shape 224 is different than the second cross-sectional shape 226, giving the ceiling portion 120 an asymmetrical cross-section. For example, in the illustrated embodiment, the ceiling portion 120 has an asymmetrical wave-like cross-section with an inflection point 222 positioned at least proximate to the recess 122 and the central portion 203 of the passenger cabin 100. Accordingly, the ceiling portion 120 can be recessed upwardly above the left- and right-side seat sections 141 and 142, respectively, to provide additional headroom at these sections. In a further aspect of this embodiment, the luggage bin 110 is positioned at least proximate to the inflection point 222 above the central seat section 143. Accordingly, the luggage bin 110 can efficiently utilize the volume of space available above the seats 143 of the central portion 203 of the passenger cabin 100.

In other embodiments, the luggage bin 110 can be positioned more toward the left- or right-side portions 201 and 202, respectively, of the passenger cabin 100. In further embodiments, the ceiling portion 120 can have asymmetrical nonwave-like cross-sections. In still further embodiments, the ceiling portion 120 can have a symmetrical cross-section similar to conventional aircraft passenger cabin ceilings. In any of these embodiments, the lower portion 112 of the luggage bin 110 can be supported relative to the ceiling portion 120 by the support member 116.

In one embodiment, the support member 116 includes an upper region 217 and a lower region 218. In one aspect of this embodiment, the lower region 218 is fixedly attached to the first portion 112 at least proximate to a center of the elliptical planform of the first portion 112. In other embodiments, the lower region 218 can be fixedly attached to the first portion 112 at other locations. The upper region 217 of the support member 116 can be fixedly attached proximate to the second portion 114 of the luggage bin 110. For example, in one embodiment, the upper region 217 can be fixedly attached to a fuselage frame 238 adjacent to the second portion 114. In other embodiments, the upper region 217 can be fixedly attached to other structural members proximate to the second portion 114. In yet another embodiment, the upper region 217 can be fixedly attached to the second portion 114.

In one embodiment, the support member 116 includes a powered actuator 271 for automatically extending and retracting the support member 116 along the operating axis 117 to raise and lower the first portion 112. In one aspect of this embodiment, the powered actuator 271 can be remotely actuated to provide access to the interior of the luggage bin 110 at desired times. For example, in one embodiment, an aircraft crew member (not shown) can lower the first portion 112 by operating a control switch (not shown) located at a flight attendant station (also not shown). In one aspect of this embodiment, a crew member can lower the first portion 112 to open the luggage bin 110 prior to passengers enplaning and/or deplaning. In another embodiment, the luggage bin 110 can be opened or closed via a control switch located in the cockpit of the aircraft. In yet another embodiment, the luggage bin 110 can be opened or closed in response to passenger operation of a control switch located on the control panel 144 shown in FIG. 1B. In still further embodiments, the luggage bin 110 can be opened and closed in other manners.

In yet another embodiment, the support member 116 can be at least partially manually extended and retracted along the operating axis 117 to raise and lower the first portion 112. For example, in one aspect of this embodiment, a passenger or crew member can simply pull down on a portion (e.g., such as a handle or latch; not shown) of the first portion 112 to open the luggage bin 110. Similarly, the passenger or crew member can then push upwardly on the first portion 112 to close the luggage bin 110. In a further aspect of this embodiment, the support member 116 can include features such as a pneumatic or spring device that reduce the force required to raise or lower the first portion 112.

As discussed above, the support member 116 can be extendable and retractable along the operating axis 117 to move the first portion 112 between the first or lowermost position as shown in FIG. 2 and the second or uppermost position as shown in FIG. 1B. In one embodiment, the first portion 112 linearly translates between the first position and the second position. In other embodiments, the first portion 112 can move in other ways between the first position and the second position, such as by partially rotating. In any of these embodiments, an outer periphery 213 of the first portion 112 can be a distance 215 above a floor 204 of the passenger cabin 100 when the first portion 112 is in the first or lowermost position. In one embodiment, the distance 215 can be between about 48 inches and about 72 inches. In another embodiment, the distance 215 can be between about 60 inches and about 70 inches. In yet another embodiment, the distance 215 can be about 67 inches. In other embodiments, the distance 215 can be other values. Positioning the outer periphery 213 at the distance 215 can facilitate the placement of luggage (not shown) into the first portion 112 by passengers (also not shown). In addition, such positioning of the outer periphery 213 can prevent the first portion 112 from impacting a passenger (not shown) seated in the central seat section 143 when the first portion 112 is moved to the lowermost position.

Although embodiments of the luggage bin 110 shown in FIG. 2 include the second portion 114, in other embodiments, the second portion 114 can be omitted. For example, in other embodiments, the second portion 114 can be omitted and luggage (not shown) residing on the first portion 112 will not be enclosed from above when the first portion 112 is retracted to the uppermost position. In other embodiments, the second portion 114 can be omitted and a recess for receiving luggage (not shown) can be integrally formed in the ceiling 120 adjacent to the first portion 112. In other embodiments, the luggage bin 110 can be configured in other ways without the second portion 114.

Figure 3:
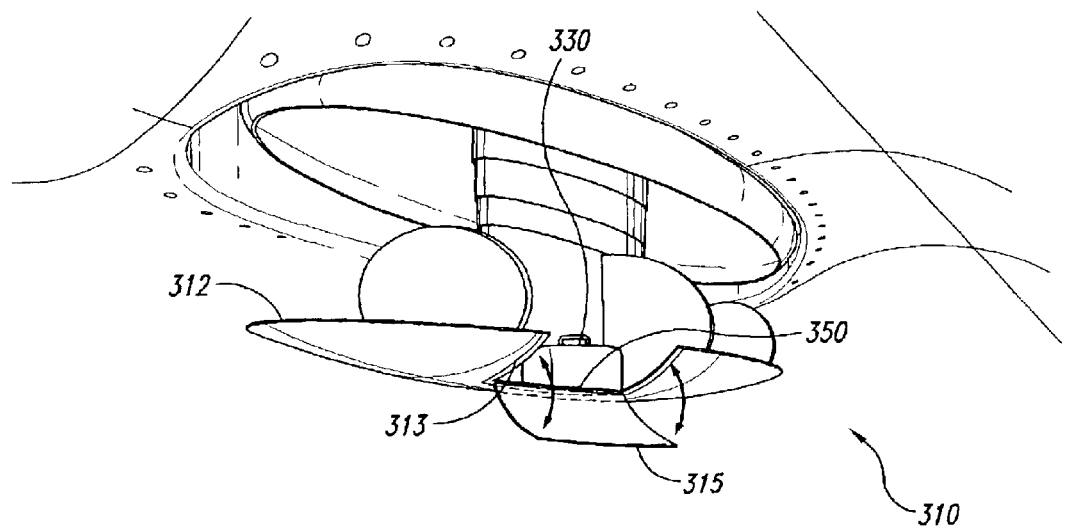
FIG. 3 is a front isometric view of a luggage bin having a first portion with a movable panel portion and an adjacent frame portion in accordance with an embodiment of the invention.

FIG. 3 is a front isometric view of a luggage bin 310 having a first portion 312 with a movable panel portion 315 and an adjacent frame portion 313 in accordance with an embodiment of the invention. In one aspect of this embodiment, the movable panel portion 315 is hingedly connected to the frame portion 313 at a hinge-line 350. In another aspect of this embodiment, the movable panel portion 315 is pivotable between an open or first position offset from the frame portion 313 as shown in FIG. 3 and a second position (not shown) at least approximately flush with the frame portion 313. Accordingly, a passenger (not shown) can lower the movable panel portion 315 to the angularly offset position shown in FIG. 3 to facilitate access to luggage 330 on the first portion 312. Although only one movable panel portion 315 is shown in FIG. 3, in other embodiments, the first portion 312 can include two or more movable panel portions. In yet other embodiments, the first portion 312 can include other types of movable portions, such as slidable or removable panel portions. In still further embodiments, the movable panel portion 315 can include additional edge or side members (not shown) configured to support luggage positioned on the moveable panel portion 315 when the moveable panel portion 315 is in the first or open position as shown in FIG. 3.

Figure 4:
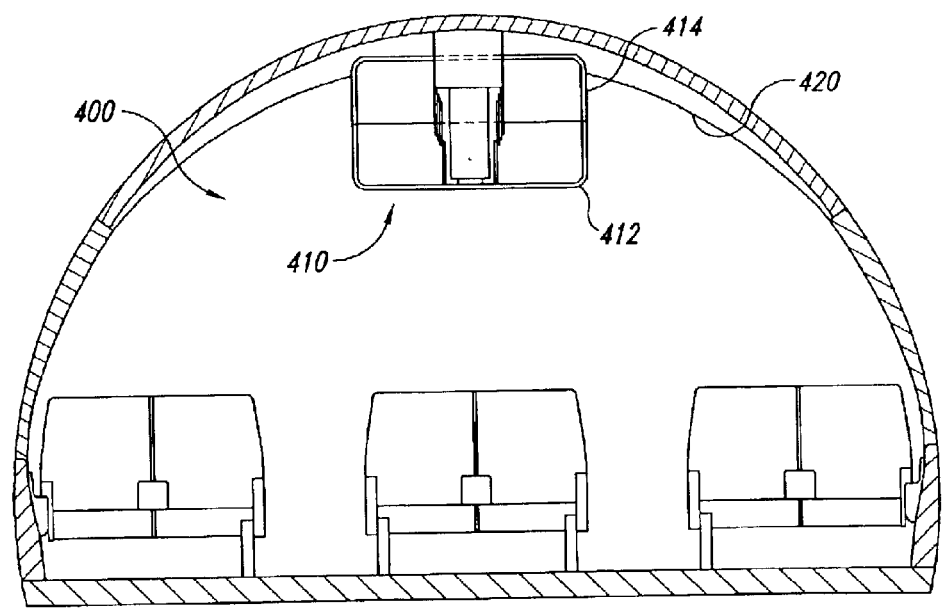
FIG. 4 is a forward cross-sectional elevation view of a passenger cabin having a luggage bin with a generally rectangular cross-section in accordance with an embodiment of the invention.

FIG. 4 is a forward cross-sectional elevation view of a passenger cabin 400 having a luggage bin 410 with a generally rectangular cross-section in accordance with an embodiment of the invention. In one aspect of this embodiment, the luggage bin 410 includes a first portion 412 and a second portion 414. The second portion 414 is positioned proximate to a passenger cabin ceiling portion 420. In a further aspect of this embodiment, the luggage bin 410 is at least generally similar in structure and function to the luggage bin 110 described above with reference to FIGS. 1A–2. However, in the illustrated embodiment, the first portion 412 has a rectangular cross section instead of the elliptical cross section of the first portion 112 shown in FIG. 2. In another embodiment, the first portion 412 can have an oval cross-section. In yet other embodiments, the first portion 412 can have other cross-sections. In yet another aspect of this embodiment, the ceiling portion 420 is at least approximately symmetrical with a substantially circular cross-section. In other embodiments, the ceiling portion 420 can have other cross-sectional shapes.

Figure 5:
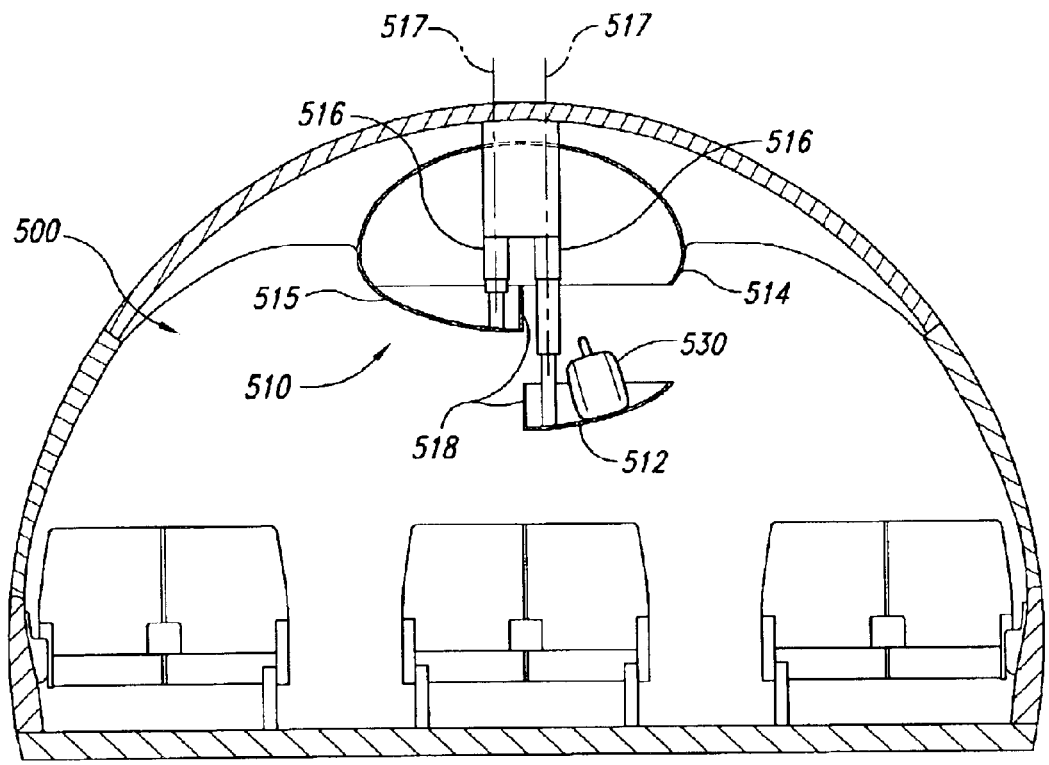
FIG. 5 is a forward cross-sectional elevation view of a passenger cabin having a luggage bin with independently movable first and third portions in accordance with an embodiment of the invention.

FIG. 5 is a forward cross-sectional elevation view of a passenger cabin 500 having a luggage bin 510 with independently movable first and third portions 512 and 515, respectively, in accordance with an embodiment of the invention. In one aspect of this embodiment, independent support members 516 extend upwardly from the first and third portions 512 and 515 and are fixedly attached proximate to a second portion 514. The support members 516 are extendable and retractable along operating axes 517 to independently move the first and third portions 512 and 515 between first or lowermost positions offset from the second portion 514 and second or uppermost positions adjacent to the second portion 514. In a further aspect of this embodiment, the support members 516 can be at least generally similar to the support member 116 of the luggage bin 110 described above and shown in FIGS. 1A–2. In yet another aspect of this embodiment, the first and third portions 512 and 515 can be at least generally similar to respective halves of the first portion 112 of the luggage bin 110 shown in FIGS. 1A–2. In addition, the first and third portions 512 and 515 can include inboard edge members 518 to support the luggage 530.

One advantage of the luggage bin 510 is the versatility it offers. For example, by having independently movable portions 512 and 515, the entire luggage bin 510 does not have to be opened for a particular passenger to retrieve a single piece of luggage. Although two independently movable portions are shown in FIG. 5, in other embodiments, the luggage bin 510 can include three or more independently movable portions. In yet other embodiments, the independently movable portions can be optionally movable in concert as a unitary first portion similar to the first portion 112 shown in FIGS. 1A–2.

FIGS. 6A–D are partially cutaway front views of luggage bins 610a–d, respectively, having powered support members 616a–d with various types of extendable and retractable actuators in accordance with embodiments of the invention. In all the embodiments illustrated in FIGS. 6A–D, the support members 616a–d include a telescoping shroud 619 enclosing the corresponding actuator. In other embodiments, the telescoping shroud 619 can be omitted, or other types of shrouds or protective or decorative covers can be used to enclose the actuators.

Figure 6A:
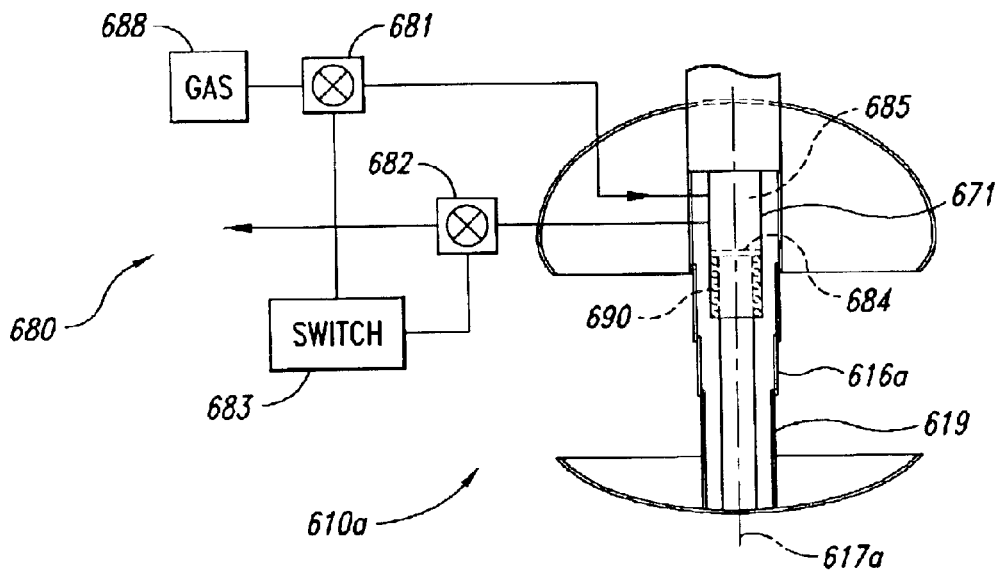
FIGS. 6A–D are partially cutaway front views of luggage bins having powered support members with various types of actuators in accordance with other embodiments of the invention.

In FIG. 6A, the support member 616a includes a telescoping actuator 671. In one embodiment, the telescoping actuator 671 can be pneumatically extended and retracted along an operating axis 617a. In another embodiment, the telescoping actuator 671 can be hydraulically extended and retracted along the operating axis 617a. In yet other embodiments, the telescoping actuator 671 can be extended and retracted in other ways.

In one embodiment, the telescoping actuator 671 is pneumatically actuated by a pneumatic system 680 shown schematically in FIG. 6A. In one aspect of this embodiment, the pneumatic system 680 includes a gas source 688, a first valve 681, a second valve 682, and a control switch 683. In a further aspect of this embodiment, the telescoping actuator 671 includes a cylinder portion 685, a piston portion 684, and a spring 690. To extend the telescoping actuator 671 and open the luggage bin 610a, an operator (not shown) manipulates the control switch 683 to open the first valve 681, allowing gas from the gas source 688 to flow into the cylinder portion 685 and drive the piston portion 684 downwardly. To close the luggage bin 610a, the operator manipulates the control switch 683 to close the first valve 681 and open the second valve 682, allowing the cylinder portion 685 to vent. As the cylinder portion 685 is venting, the spring 690 forces the piston portion 684 upwardly in the cylinder portion 685 to close the luggage bin 610a.

In another embodiment, the luggage bin 610a can be configured to automatically retract into a closed position in the event of a power loss. For example, the second valve 682 can be a solenoid valve having the nonenergized or default position being an open position causing the cylinder portion 685 to automatically vent in the event of a power loss. As the cylinder portion 685 vents, the spring 690 forces the piston portion 684 upward to close the luggage bin 610a. In other embodiments, the luggage bin 610a can be configured to automatically extend into an open position in the event of a power loss. In yet other embodiments, the luggage bin 610a can be configured to remain at least approximately stationary in the event of a power loss.

Figure 6B:
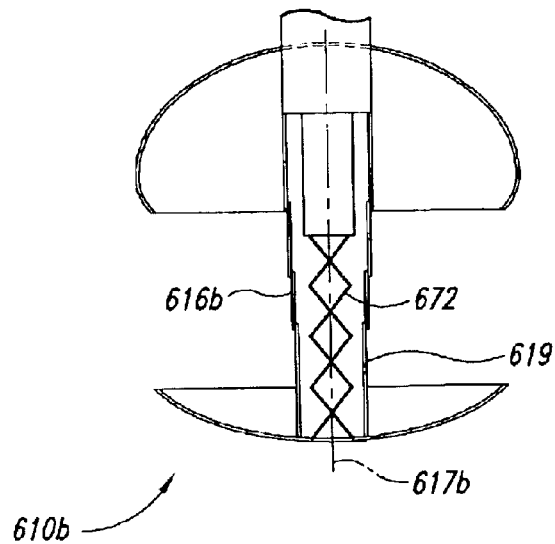

As shown in FIG. 6B, the support member 616b includes a scissors-type mechanism 672 that is extendable and retractable along an operating axis 617b. In one aspect of this embodiment, the scissors-type mechanism 672 can be electrically powered. In other embodiments, the scissors-type mechanism 672 can be extended and retracted using other power systems.

Figures 6C, 6D:
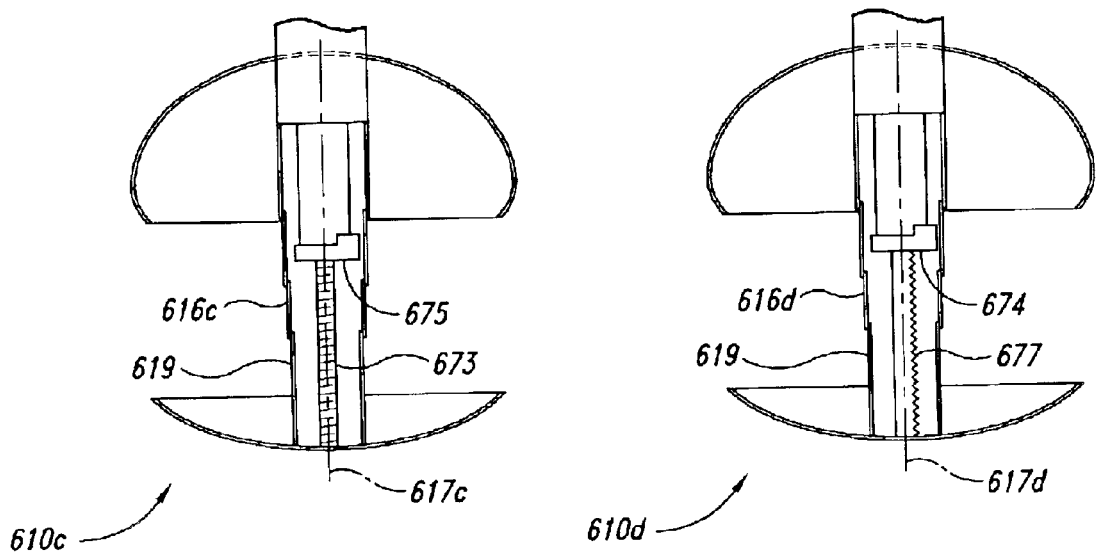

As shown in FIG. 6C, the support member 616c includes a worm-screw actuator 673 that is extendable and retractable along an operating axis 617c. In one aspect of this embodiment, the worm-screw actuator 673 can be extended and retracted by an electric drive-motor 675. In other embodiments, the worm-screw actuator 673 can be extended and retracted using other systems.

As shown in FIG. 6D, the support member 616d includes a rack-and-pinion actuator 674 that is extendable and retractable along an operating axis 617d. In one aspect of this embodiment, the rack-and-pinion actuator 674 is extended and retracted by an electric drive-motor 677. In other embodiments, the rack-and-pinion actuator 674 can be extended and retracted using other systems.

The support members 616a–d illustrated in FIGS. 6A–D represent only some of the support member configurations that can be used in accordance with the present invention. Accordingly, in other embodiments, other support members can be used. In yet other embodiments, the luggage bins 610b–d described above with reference to FIGS. 6B–D can be configured to operate at least generally similarly to the luggage bin 610a described above with reference to FIG. 6A in the event of a power loss.

Figure 7A:
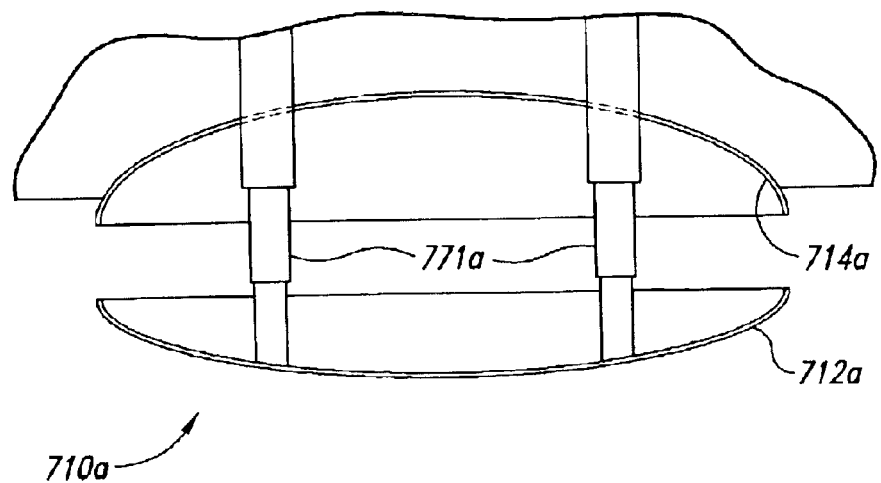
FIGS. 7A–B are partially cutaway side views of luggage bins having multiple support members in accordance with further embodiments of the invention.
Figure 7B:
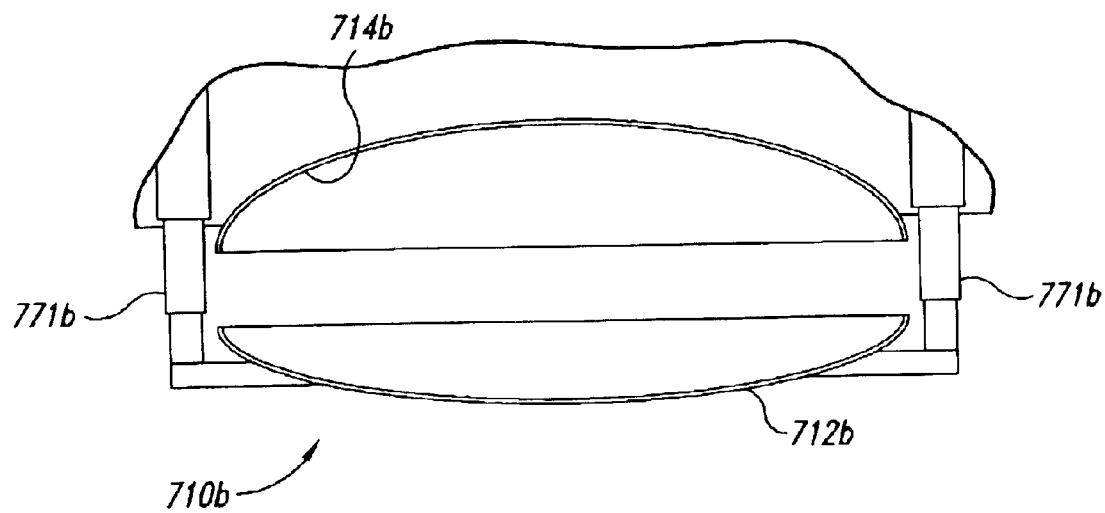

FIGS. 7A and 7B are partially cutaway side views of luggage bins 710a and 710b, respectively, having multiple support members 771a and 771b, respectively, in accordance with embodiments of the invention. FIG. 7A illustrates the luggage bin 710a with the support members 771a positioned inside the planform of a first portion 712a. FIG. 7B illustrates the luggage bin 710b with the support members 771b positioned outside the planform of a first portion 712b. In one aspect of these embodiments, the support members 771a and 771b can be at least generally similar in structure and function to the support members 116 and 616a–d described above with reference to FIGS. 1A and 6A–D. Accordingly, the support members 771a and 771b move the first portions 712a and 712b relative to corresponding second portions 714a and 714b. In other embodiments, other arrangements of more or fewer support members are possible.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A luggage bin configured for use with a passenger cabin of an aircraft, the luggage bin comprising:

a first portion configured to support luggage;

a second portion having an opening, wherein the passenger cabin has an asymmetrical ceiling portion and the second portion is configured to be positioned adjacent to the asymmetrical ceiling portion, and wherein the first portion is configured to be positioned at least partially adjacent to the opening; and at least one support member extending upwardly from the first portion, the at least one support member having a lower region, an upper region, and an operating axis, the lower region being fixedly attached to the first portion, the upper region configured to be fixedly attached at least proximate to the ceiling portion of the passenger cabin, the at least one support member being extendable and retractable along the operating axis to linearly translate the carrying portion relative to the ceiling portion when the upper region of the at least one support member is fixedly attached at least proximate to the ceiling portion.

2. The luggage bin of claim 1 wherein the first portion is moveable between a lowermost position and an uppermost position when the upper region of the at least one support member is fixedly attached proximate to the ceiling portion, and wherein the first portion linearly translates for at least approximately the entire distance between the lowermost position and the uppermost position as the at least one support member extends and retracts.

3. The luggage bin of claim 1 wherein the first portion is moveable between a lowermost position and an uppermost position when the upper region of the at least one support member is fixedly attached proximate to the ceiling portion, and wherein the first portion is configured to be positioned at least partially adjacent to the opening when the first portion is in the uppermost position.

4. The luggage bin of claim 1 wherein the first portion is configured to support between about two pieces and about 30 pieces of carryon-size luggage.

5. The luggage bin of claim 1 wherein the first portion is configured to support between about 10 pieces and about 20 pieces of carryon-size luggage.

6. The luggage bin of claim 1 configured for use with a passenger cabin having a left-side seat section, a right-side seat section, and a center seat section, wherein the luggage bin is configured to be positioned at least approximately in vertical alignment with the center seat section.

7. The luggage bin of claim 1 wherein the at least one support member includes a telescoping actuator having a lower part, an upper part, and a longitudinal axis, the lower part being fixedly attached toward the carrying portion of the luggage bin and the upper part configured to be fixedly attached toward the ceiling portion of the passenger cabin, the telescoping actuator being extendable and retractable along the longitudinal axis to move the carrying portion relative to the ceiling portion when the upper part of the actuator is fixedly attached toward the ceiling portion.

8. The luggage bin of claim 1 wherein the at least one support member is at least partially manually extendable and retractable to move the first portion relative to the ceiling portion.

9. The luggage bin of claim 1 wherein the upper region of the at least one support member is configured to be fixedly attached at least proximate to the ceiling portion of the passenger cabin outside of the second portion.

10. The luggage bin of claim 1 wherein at least part of the first portion is accessible from at least approximately the entire periphery of the first portion when the first portion is in a lowermost position.

11. The luggage bin of claim 1 wherein the periphery of the first portion is configured to be positioned at least partially adjacent to the opening.

12. A luggage bin configured for use with a passenger cabin of an aircraft, the luggage bin comprising:

a first portion configured to support luggage;

a second portion having an opening, wherein the passenger cabin has an asymmetrical ceiling portion with a wave-form cross-section, wherein the second portion is configured to be positioned adjacent to the asymmetrical ceiling portion, and wherein the first portion is configured to be positioned at least partially adjacent to the opening; and at least one support member extending upwardly from the first portion, the at least one support member having a lower region, an upper region, and an operating axis, the lower region being fixedly attached to the first portion, the upper region configured to be fixedly attached at least proximate to the ceiling portion of the passenger cabin, the at least one support member being extendable and retractable along the operating axis to linearly translate the carrying portion relative to the ceiling portion when the upper region of the at least one support member is fixedly attached at least proximate to the ceiling portion.

13. The luggage bin of claim 12 wherein the passenger cabin further includes a left-side portion, a right-side portion, and a center portion, wherein the wave-form cross-section has an inflection point at least proximate to the center portion of the passenger cabin, and wherein the second portion is configured to be positioned at least proximate to the inflection point.

14. The luggage bin of claim 12 wherein the first portion is moveable between a lowermost position and an uppermost position when the second part of the at least one support member is attached at least proximate to the ceiling portion, and wherein the first portion linearly translates for at least approximately the entire distance between the lowermost position and the uppermost position as the at least one powered support member extends and retracts.

15. The luggage bin of claim 12 wherein the first portion is moveable between a lowermost position and an uppermost position when the second part of the at least one support member is fixedly attached at least proximate to the ceiling portion, and wherein the first portion is configured to be positioned at least partially adjacent to the opening when the first portion is in the uppermost position.

16. The luggage bin of claim 12 wherein the first portion is configured to support between about two pieces and about 10 pieces of carryon-size luggage.

17. The luggage bin of claim 12 configured for use with a passenger cabin having a left-side seat section, a right-side seat section, and a center seat section, wherein the luggage bin is configured to be positioned at least approximately in vertical alignment with the center seat section.

18. The luggage bin of claim 12 wherein the upper region of the at least one support member is configured to be fixedly attached at least proximate to the ceiling portion of the passenger cabin outside of the second portion.

19. The luggage bin of claim 12 wherein the first portion is configured to support between about 10 pieces and about 20 pieces of carryon-size luggage.

20. The luggage bin of claim 12 configured for use with a passenger cabin having a left-side seat section, a right-side seat section, and a center seat section, wherein the luggage bin is configured to be positioned at least approximately in vertical alignment with the center seat section.

21. A luggage bin configured for use with a passenger cabin of an aircraft, the luggage bin comprising:
  a first portion configured to support luggage, the first portion having a periphery with at least first and second edges, the first edge being opposite to the second edge;
  a second portion having an opening, wherein the passenger cabin has an asymmetrical ceiling portion and the second portion is configured to be positioned adjacent to the asymmetrical ceiling portion; and
  at least one powered support member extending from the first portion, the at least one powered support member having a first part attached to the first portion and a second part configured to be attached at least proximate to the ceiling portion of the passenger cabin, the at least one powered support member being automatically extendable and retractable to linearly translate the first portion between a lowermost position and an uppermost position when the second part of the at least one powered support member is fixedly attached at least proximate to the ceiling portion, wherein at least part of the first portion is accessible from both the first and second edges when the first portion is in the lowermost position, and wherein the first portion is configured to be positioned at least partially adjacent to the opening when the first portion is in the uppermost position.

22. The luggage bin of claim 21 wherein the at least one powered support member includes a telescoping actuator having a first end, a second end, and a longitudinal axis, the first end being attached toward the first portion of the luggage bin and the second end configured to be attached toward the ceiling portion of the passenger cabin, the telescoping actuator being extendable and retractable along the longitudinal axis to move the first portion relative to the ceiling portion when the second end of the actuator is attached toward the ceiling portion.

23. A passenger cabin for an aircraft, the passenger cabin comprising:

a ceiling having an asymmetrical cross-section with a left-side portion, a right-side portion, and a center portion;
  a luggage bin first portion configured to support luggage;
  a luggage bin second portion having an opening, the luggage bin second portion being positioned at least proximate to the center portion of the ceiling, the luggage bin first portion being moveable between a first position at least partially adjacent to the opening and a second position offset from the opening; and
  at least one support member having a lower region attached to the luggage bin first portion and an upper region attached at least proximate to the luggage bin second portion, the at least one support member being extendable and retractable to linearly translate the luggage bin first portion between the first position and the second position.

24. The passenger cabin of claim 23 wherein the at least one support member includes an operating axis, and wherein the at least one support member is extendable and retractable along the operating axis to linearly translate the luggage bin first portion between the first position and the second position.

25. The passenger cabin of claim 23 wherein the luggage bin first portion is configured to support between about two pieces and about 30 pieces of carryon-size luggage.

26. The passenger cabin of claim 23 wherein the luggage bin first portion is configured to support between about 10 pieces and about 20 pieces of carryon-size luggage.

27. The passenger cabin of claim 23 wherein the ceiling has an asymmetrical wave-form cross-section.

28. The passenger cabin of claim 23 wherein the ceiling has an asymmetrical wave-form cross-section with an inflection point at least proximate to the center portion of the ceiling, and wherein the luggage bin second portion is configured to be positioned at least proximate to the inflection point.

29. The passenger cabin of claim 23 wherein the at least one support member includes a telescoping actuator having a lower part, an upper part, and a longitudinal axis, the lower part being fixedly attached toward the luggage bin first portion and the upper part being fixedly attached toward the luggage bin second portion, the telescoping actuator being extendable and retractable along the longitudinal axis to move the luggage bin first portion between the first position and the second position.

30. The passenger cabin of claim 23 wherein the luggage bin first portion is manually moveable between the first position and the second position.

31. The passenger cabin of claim 23 wherein the luggage bin first portion includes a periphery with at least first and second edges, the first edge being opposite to the second edge, and wherein at least part of the luggage bin first portion is accessible from the first and second edges when the luggage bin first portion is in the second position.

32. The passenger cabin of claim 31 wherein at least part of the luggage bin first portion is accessible from at least approximately the entire periphery of the luggage bin first portion when the luggage bin first portion is in the second position.

33. A luggage bin configured for use with a passenger cabin of an aircraft, the luggage bin comprising:
  a first portion configured to support luggage, the first portion having a periphery with at least first and second edges, the first edge being opposite to the second edge;
  a second portion having an opening, wherein the passenger cabin has an asymmetrical ceiling portion with a wave-form cross-section, wherein the second portion is configured to be positioned adjacent to the asymmetrical ceiling portion, and wherein the periphery of the first portion is configured to be positioned at least partially adjacent to the opening; and at least one support member extending upwardly from the first portion, the at least one support member having a lower region, an upper region, and an operating axis, the lower region being fixedly attached to the first portion, the upper region configured to be fixedly attached at least proximate to the ceiling portion of the passenger cabin, the at least one support member being extendable and retractable along the operating axis to move the carrying portion between a lowermost position and an uppermost position relative to the ceiling portion when the upper region of the at least one support member is fixedly attached at least proximate to the ceiling portion, wherein at least part of the first portion is accessible from both the first and second edges when the first portion is in the lowermost position.

34. A luggage bin configured for use with a passenger cabin of an aircraft, the luggage bin comprising:

a first portion configured to support luggage, the first portion having a periphery with at least first and second edges, the first edge being opposite to the second edge;

a second portion having an opening, wherein the passenger cabin has an asymmetrical ceiling portion and the second portion is configured to be positioned adjacent to the asymmetrical ceiling portion, and wherein the periphery of the first portion is configured to be positioned at least partially adjacent to the opening; and at least one support member extending upwardly from the first portion, the at least one support member having a lower region, an upper region, and an operating axis, the lower region being fixedly attached to the first portion, the upper region configured to be fixedly attached at least proximate to the ceiling portion of the passenger cabin, the at least one support member being extendable and retractable along the operating axis to move the carrying portion between a lowermost position and an uppermost position relative to the ceiling portion when the upper region of the at least one support member is fixedly attached at least proximate to the ceiling portion, wherein at least part of the first portion is accessible from both the first and second edges when the first portion is in the lowermost position.

35. The luggage bin of claim 34 wherein the at least one support member includes a telescoping actuator having a lower part, an upper part, and a longitudinal axis, the lower part being fixedly attached toward the carrying portion of the luggage bin and the upper part configured to be fixedly attached toward the ceiling portion of the passenger cabin, the telescoping actuator being extendable and retractable along the longitudinal axis to move the carrying portion relative to the ceiling portion when the upper part of the actuator is fixedly attached toward the ceiling portion.

36. The luggage bin of claim 34 wherein the at least one support member is at least partially manually extendable and retractable to move the carrying portion relative to the ceiling portion.

37. The luggage bin of claim 34 configured for use with a passenger cabin having a left-side seat section, a right-side seat section, and a center seat section, wherein the luggage bin is configured to be positioned at least approximately in vertical alignment with the center seat section.

38. A passenger cabin for an aircraft, the passenger cabin comprising:

a ceiling portion having a centerline at least generally aligned with a longitudinal axis of the aircraft, wherein a first cross-sectional shape of the ceiling portion on a first side of the centerline is different than a second cross-sectional shape of the ceiling portion on a second side of the centerline;

a luggage bin first portion configured to support luggage;

a luggage bin second portion having an opening, the luggage bin second portion being positioned at least proximate to the centerline of the ceiling portion, the luggage bin first portion being moveable between a first position at least approximately adjacent to the opening and a second position offset from the opening; and at least one support member having a first region attached to the luggage bin first portion and a second region attached at least proximate to the luggage bin second portion, the at least one support member being moveable to move the first portion between the first position and the second position.

39. The passenger cabin of claim 38 wherein the at least one support member includes an operating axis, and wherein the at least one support member is extendable and retractable along the operating axis to linearly translate the luggage bin first portion between the first position and the second position.

40. The passenger cabin of claim 38 wherein the luggage bin first portion has an elliptically shaped planform and the first region of the at least one support member is fixedly attached to the luggage bin first portion at least proximate to the center of the elliptically shaped planform.

41. The passenger cabin of claim 38 wherein the luggage bin first portion has an elliptically shaped planform and the opening in the luggage bin second portion is shaped and sized to at least partially receive the luggage bin first portion.

42. The passenger cabin of claim 38 wherein the luggage bin first portion is configured to support between about two pieces and about 30 pieces of carryon-size luggage.

43. The passenger cabin of claim 38 wherein the luggage bin first portion is configured to support between about 10 pieces and about 20 pieces of carryon-size luggage.

44. The passenger cabin of claim 38 wherein the ceiling portion has a wave-form cross-section.

45. The passenger cabin of claim 38 wherein the ceiling portion defines an interior surface portion of the passenger cabin, and wherein the luggage bin first portion is positioned at least approximately flush with the interior surface portion when the luggage bin first portion is in the first position.

46. The passenger cabin of claim 38 further comprising:

at least one passenger seat;

at least one light positioned adjacent the luggage bin second portion, the at least one light having an on mode and an off mode, the at least one light configured to provide light proximate to the at least one passenger seat when the at least one light is in the on mode; and a light control positioned adjacent to the at least one passenger seat, the light control configured to control the mode of the at least one light in response to passenger manipulation.

47. The passenger cabin of claim 46 wherein the at least one passenger seat includes at least one armrest, and wherein the light control is positioned adjacent to a portion of the armrest.

48. The passenger cabin of claim 38 further comprising:

at least one passenger seat;

at least one air outlet positioned adjacent the luggage bin second portion, the at least one air outlet having an on mode and an off mode, the at least one air outlet configured to provide air proximate to the at least one passenger seat when the at least one air outlet is in the on mode; and an air outlet control positioned adjacent to the at least one passenger seat, the air outlet control configured to control the mode of the at least one air outlet in response to passenger manipulation.

49. The passenger cabin of claim 48 wherein the at least one passenger seat includes at least one armrest, and wherein the air outlet control is positioned adjacent to a portion of the armrest.

50. A passenger cabin for an aircraft, the passenger cabin comprising:

a ceiling having a central ceiling portion at least generally alignable with a longitudinal axis of the aircraft, a first side ceiling portion positioned on a first side of the central portion, the first side ceiling portion having a first cross-sectional shape, and a second side ceiling portion positioned on a second side of the central portion, the second side ceiling portion having a second cross-sectional shape different than the first cross-sectional shape; and at least one luggage bin positioned proximate to the ceiling.

51. The passenger cabin of claim 50 wherein the first side ceiling portion, the central ceiling portion, and the second side ceiling portion together define a wave-form cross-sectional shape.

52. The passenger cabin of claim 50 wherein the first side ceiling portion, the central ceiling portion, and the second side ceiling portion together define a wave-form cross-sectional shape, and wherein the central ceiling portion includes an inflection point at least approximately alignable with the longitudinal axis of the aircraft.

53. The passenger cabin of claim 50 wherein the first side ceiling portion is at least generally convex and the second side ceiling portion is at least generally concave.

54. The passenger cabin of claim 50 wherein the luggage bin comprises:

a carrying portion configured to support luggage; and at least one support member extending upwardly from the carrying portion, the at least one support member having a lower region, an upper region, and an operating axis, the lower region being fixedly attached to the carrying portion, the upper region being fixedly attached at least proximate to the ceiling of the passenger cabin, the at least one support member being extendable and retractable along the operating axis to linearly translate the carrying portion relative to the ceiling.

55. The passenger cabin of claim 54 wherein the upper region of the at least one support member is fixedly attached at least proximate to the central portion of the ceiling.

56. The passenger cabin of claim 50 wherein the luggage bin comprises:

a carrying portion configured to support luggage; and at least one powered support member extending from the carrying portion, the at least one powered support member having a first part attached to the carrying portion and a second part attached at least proximate to the ceiling of the passenger cabin, the at least one powered support member being automatically extendable and retractable to move the carrying portion relative to the ceiling.

57. A ceiling for a passenger cabin of an aircraft, the ceiling comprising:

a central portion at least generally alignable with a longitudinal axis of the aircraft;

a first side portion positioned on a first side of the central portion, the first side portion having a first cross-sectional shape; and a second side portion positioned on a second side of the central portion, the second side portion having a second cross-sectional shape different than the first cross-sectional shape.

58. The ceiling of claim 57 wherein the first side portion, the central portion, and the second side portion together define a wave-form cross-sectional shape.

59. The ceiling of claim 57 wherein the first side portion, the central portion, and the second side portion together define a wave-form cross-sectional shape, and wherein the central portion includes an inflection point at least approximately alignable with the longitudinal axis of the aircraft.

60. The ceiling of claim 57 wherein the first side portion is at least generally convex and the second side portion is at least generally concave.

61. The ceiling of claim 57 wherein the central portion is configured to support a luggage bin.

62. The ceiling of claim 57 wherein the central portion includes a recess configured to receive a luggage bin.

* * * * *